Aug. 30, 1966  F. A. LINVILLE  3,269,174
STRESS SENSOR AND STRESS SENSING SYSTEM
Filed March 9, 1964

INVENTOR.
FRANK A. LINVILLE
BY McLaughlin & Cahill
ATTORNEYS

United States Patent Office 3,269,174
Patented August 30, 1966

3,269,174
STRESS SENSOR AND STRESS
SENSING SYSTEM
Frank A. Linville, 728 N. Campbell, Tucson, Ariz.
Filed Mar. 9, 1964, Ser. No. 350,228
6 Claims. (Cl. 73—88.5)

The present invention pertains to stress sensors and stress sensing systems, and more particularly, to systems for measuring stresses with an accuracy and facility heretofore unattainable by prior art stress measuring instruments.

In spite of the pervasive significance of internal stress distribution in structures of all kinds, the distribution is often known only approximately. For instance, in many cases, stress concentration problems arise which are not amenable to analytical methods; and suitable, internal stress measuring instruments are not available. If suitable instruments for measuring internal stress distributions were available, development of general theories would become possible.

There are only a few kinds of "stress measuring" instruments. Stress being an abstraction is always measured indirectly. Deformation is observed, strain is calculated and then correlated to stress by an empirical stress-strain relationship. A stress measuring instrument is in reality a strain gage.

Ordinarily, change in strain is itself measured indirectly. Most commonly, change in strain is measured by observing change in electrical resistance of wire, foil or of a semi-conductor bar cemented to the surface of the member to be stressed. Change in electrical resistance accompanies deformation of the sensor. This deformation of the sensor is interpreted to be the deformation of the member at the sensor site due to the stresses imposed. The phenomenon of change in electrical resistance accompanying mechanical deformation is called the "piezoresistive effect."

Another kind of stress measuring instrument uses the depressed diaphragm. For instance, internal compressive changes in strain, occurring in unconsolidated materials such as soils, are often observed by measuring the movement of a circular diaphragm at the face of an instrument embedded in the material. The movement of the diaphragm is measured in a variety of ways, the commonest makes use of the piezoresistive effect. Both piezoresistive gages and daphragm gages have several well-known disadvantages.

Wire and foil, the commonest types of piezoresistive gages, have poor sensitivity. The gage factor, that is, the ratio between change in resistance and original resistance times strain, is only about 3. In an attempt to overcome this insensitivity, two or more arms of the Wheatstone bridge circuitry are filled with gages. Even so, the change in resistance remains very small for moderate strains. Semi-conductor bar gages, however, which are gaining in acceptance, are far more sensitive, having gage factors of 200 and even higher.

Piezoresistive gages are notoriously subject to extraneous signals. Furthermore, all piezoresistive gages lose some unknown portion of strain due to the bonding procedure. It is assumed that the indicated strain is equal to the strain in the test specimen. Commonly, however, the strain sensitive element is cemented to a paper or plastic backing one or more sheets thick. This unit in turn is cemented onto the surface of the test specimen. The yielding of plastic and cement bonds cause a loss of strain.

Piezoresistive gages are highly sensitive to temperature change. In addition, the current passing through a piezoresistive gage causes self-heating, which, when the gage is plastic mounted, that is, heat insulated, causes the gage to indicate a false strain.

Diaphragm gages are usually two to six inches in diameter; so the presence of one gage seriously distorts the stress distribution which might be observed by any gages placed in the medium farther away from the applied stress. So the act of observing with diaphragm gages distorts the distribution to be observed. Diaphragm gages measure compressive stresses only, and are often elaborately constructed. All piezoresistive and diaphragm gages must be empirically calibrated.

A third kind of empirical approach to measurement of stress distribution is the photoelastic method. This method depends upon the fact thta certain isotropic, transparent materials become doubly refracting under the action of mechanical stresses. A model of a structural member is stressed and a beam of polarized light passed through it. A colored picture of the stress distribution is then visible. This method is only suitable, however, for problems in which the deformation is essentially parallel to a plane. Also there are serious drawbacks to using models, such as unrealistic stress concentrations at holes and constrictions.

It is therefore an object of the present invention to provide an improved stress sensor and stress sensing system utilizing a different approach to the detection of stress.

It is still another object of the present invention to provide a stress sensor and stress sensing system utilizing the piezothermal effect.

It is a further object of the present invention to provide a stress sensor and stress sensing system that may be constructed less expensively, smaller, and with higher sensitivity than stress sensors of the prior art.

It is still another object of the present invention to provide a stress sensor and stress sensing system having linearity of response, negligible distortion of pressure distribution and ruggedness while having a firm theoretical foundation to support stress indications presented by the stress sensor.

Further objects and advantages of the present invention will become apparent to those skilled in the art as the description thereof proceeds. The description will be given in connection with the accompanying drawings in which.

Figure 1:
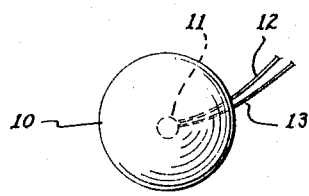
FIGURE 1 shows a stress sensor constructed in accordance with the teachings of the present invention.
Figure 2:
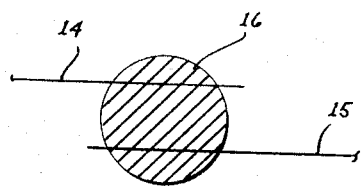
FIGURE 2 shows an enlarged portion of stress sensor of FIGURE 1.

Referring to FIGURE 1, an elastomer is shown in the form of a sphere 10. The spherical shape shown in FIGURE 1 is not necessary to the implementation of the present invention; rather, the elastomer may take any one of a variety of convenient shapes. A thermistor 11 is imbedded within the sphere 10 and electrically communicates to the outside of the sphere through conductors 12 and 13. The thermistor may more readily be seen by reference to FIGURE 2 wherein a pair of conductors 14 and 15 are shown connected to a bead of semiconducting material 16. The type of thermistor shown in FIGURE 2 is commonly referred to as a bead thermistor. The material of the thermistor is generally constructed from an electronic conductor having a resistivity at room temperature in the range of $10^{-2}$ to $10^9$ ohm-centimeters and exhibiting a high negative temperature coefficient of resistivity. The semiconductor material may typically be silicon, germanium, selenium or a variety of other conductors fallng in the designated resistivity range. For a further discussion of semiconductor materials and the physical phenomena involved in electrical conduction within semiconductors, reference may be had to "Handbook of Semiconductor Electronics," Hunter, McGraw-Hill Book Company, 1956.

The material of the sphere 10 is made of what is usually designated as an elastomer. Elastomers are materials that are deformable under stress and that generally regain their shape when the deforming force is removed. Elastomers also generally exhibit relatively large heat generation accompanying deformation. For example, rubber has been found to be an attractive elastomer for use in the stress sensor of the present invention since the changes accompanying stretching and retraction of rubber is quite large compared to that of many other substances and rubber will withstand extraordinary tensile strains. Various other rubber-like compounds may be designed to provide an elastomer more ideally suited for use in the stress sensor of the present invention.

Figure 3:
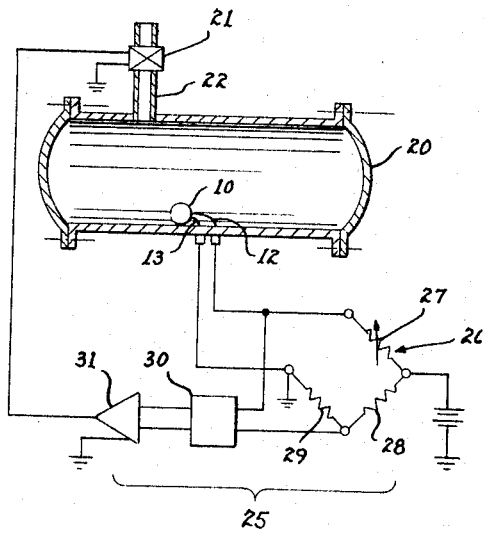
FIGURE 3 is a schematic illustration of a stress sensing system constructed in accordance with the teachings of the present invention.

Referring to FIGURE 3, a stress sensing system constructed in accordance with the teachings is shown, and includes a stress sensing device in the form of a sphere 10, shown placed within a pressure vessel 20 to detect pressure failures either within the vessel itself or within the system connected to the vessel. An appropriate electrically-operated release valve 21 is connected in a conduit 22 communicating to the interior of the pressure vessel 20. The electrical conductors 12 and 13 of the stress sensor are connected through the wall of the pressure vessel 20 to a detector means 25 for detecting and indicating a change of current flowing in an electrical circuit including the stress sensor. An electrical bridge 26 is provided having a variable resistance 27 connected in series with the sensor 10 and a current source. A pair of resistors 28 and 29 are connected in parallel with the stress sensor 10 and resistor 27. Electrical connection is made from the junction between resistor 27, sensor 10, and from between resistors 28 and 29, to a suitable detection circuit 30 for appropriately sensing a voltage above a predetermined magnitude. The circuit 30 may conveniently be of the type known as a Schmitt trigger, the output of which is connected to an amplifying device 31. The output of the amplifier is connected to the valve 21 to actuate the latter.

The operation of the apparatus of FIGURE 3 is as follows. The pressure vessel 20, containing gas or fluid at a predetermined pressure, acts upon the stress sensor sphere 10 maintaining a constant deformation of the sphere. Under these circumstances, the variable resistor 27 is adjusted so that the current flowing through the resistor 27 provides a voltage drop across the resistor 27 equal to the voltage drop across the resistor 28; the resulting voltage applied to the sensing circuit 30 is either equal to or nearly zero. In the event that a leak develops in the pressure vessel 20, and the pressure drops suddenly, or in the event that a pressure build-up occurs causing the pressure to rise rapidly, the deformation of the sphere 10 rapidly changes thereby generating heat within the elastomer to provide a temperature change for sensing by the thermistor 11. The change in resistance inserted into the bridge 26 by the thermistor causes a potential to be developed across the conductors connected to the sensing circuit 30. The appearance of a voltage at the input to the sensing circuit 30 results in the amplification through amplifier 31 of an electrical signal appropriately applied to the valve 21 to open the latter. The pressure vessel 20 is subsequently vented through conduit 22 thereby preventing serious damage to any system that may be connected to the pressure vessel. It may be noted that the sense of the voltage presented to the sensing circuit 30 (one conductor positive relative to the other) will depend on whether the change in deformation of the spherical elastomer 10 is in the direction of greater compression or lesser compression. Although the apparatus of FIGURE 3 does not utilize the differentiation in the sense of pressure change, it will be obvious that the detector means 25 may be designed to utilize the difference between an abrupt pressure increase in the pressure vessel 20 and an abrupt pressure decrease in the pressure of the vessel.

Figure 4:
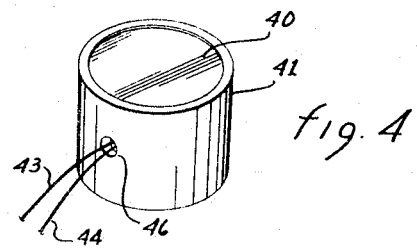
FIGURE 4 shows a modified stress sensor constructed in accordance with the teachings of the present invention.
Figure 5:
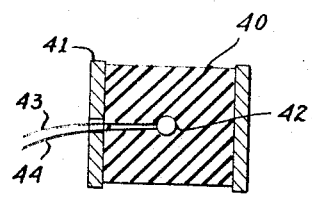
FIGURE 5 is a cross-sectional view of the stress sensor of FIGURE 4.
Figure 6:
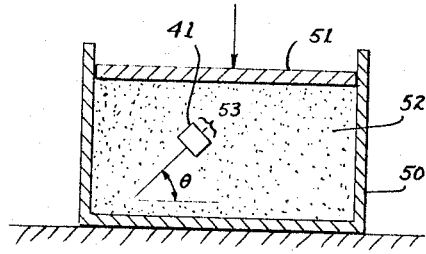
FIGURE 6 illustrates an application of the modified stress sensor of FIGURES 4 and 5.
Figure 8:
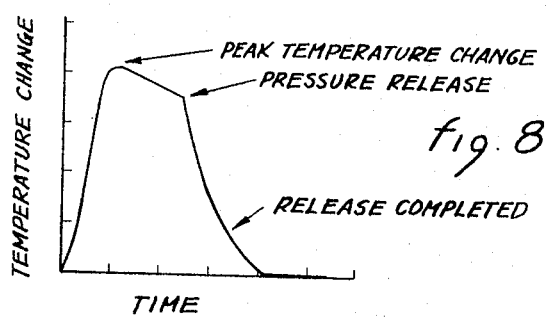
FIGURE 8 is a plot of temperature vs. time for an elastomer under compression used in the sensor of the present invention.

While the embodiment of the present invention shown in FIGURES 1 through 3 utilizes the piezothermal effect for stress measurement, it will be apparent that there is a fundamental difference between temperature and stress since the latter includes a direction as well as a magnitude. In the embodiment of FIGURES 1 through 3, the stress direction was unimportant since the quantity being measured or monitored was a rate of change of pressure; however, there will be many instances where the directional characteristics of stress will become important. Accordingly, reference is made to FIGURES 4 and 5 wherein an elastomer 40 is shown in a generally cylindrical shape. The elastomer is encased in a relatively rigid cylinder 41 which may be steel or other inflexible material (inflexible relative to the elastomer). The thermistor 42, imbedded in the elastomer 40, may be connected to an appropriate detector means such as that shown in FIGURE 3 via conductors 43 and 44. The conductors are brought out of the cylinder 41 through a small opening 46 provided in the side of the cylinder. Thus, in the embodiment shown in FIGURES 4 and 5, the deformation of the elastomer is restrained in two principal directions of an orthogonal system allowing deformation to occur only in the single remaining direction. Reference to FIGURE 6 will indicate the advantages to be gained by restraining the deformation of the elastomer in pre-determined directions. A container 50 forming a cylinder is provided with a close-fitting piston 51 inserted in the open end thereof. The container 50 and the piston 51 may be considered rigid relative to the contents placed therein which may be a material such as sand 52. Assuming that it is desired to know the stress exerted in the vicinity 53 and exerted in a direction in the plane of the drawing and an angle $\theta$ to the bottom of the container 50, this stress may be measured by the system of the present invention by placing a stress sensor such as shown in FIGURES 4 and 5 at the location illustrated in FIGURE 6. Since the sensor 41 may be made very small, the disturbance of the material 52 in the vicinity of the sensor is minimized and the stress measured by the present system will be considerably more accurate than stress sensors of the prior art. The direction of stress to be measured may be chosen merely by orienting the sensor as shown. Linearity of response is illustrated in FIG. 8 by the reproduction of a temperature-time plot of the stress sensor. Referring to FIGURE 8, a typical temperature history of a piezothermal stress sensor, subjected to compressive stress and subsequent release of stress, is shown. It may be seen that during the interval of the application of stress, that the temperature change is substantially linear. The slope of the linear portion of the curve of FIGURE 8 will determine the maximum rate of stress change that will be measurable by the sensor. The slope of the line, and the capacity to sense rapid stress changes, will differ for various elastomers. An elastomer designed to be less deformable (and one which will probably generate less heat) may be used in those instances where the slope of the linear portion of the curve of FIGURE 8 need be greater to enable the sensor to be used in applications requiring rapid response.

Figure 7:
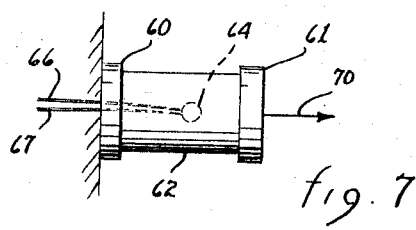
FIGURE 7 shows another modification of the stress sensor of the present invention.

The modification shown in FIGURE 7 illustrates a manner in which the sensor of the present invention may be adapted to measure tensile stress instead of compressive stress as described in connection with FIGURES 1 through 6. Referring to FIGURE 7, the pair of "buttons" 60 and 61, which may be made of metal, are cemented or otherwise bonded to an elastomer 62 formed into an elongated cylinder. A thermistor 64 is imbedded in the elastomer, and conductors 66 and 67 extend longitudinally of the cylindrical elastomer 52 out through a hole provided in the button 60. The button 60 may be secured against movement, and the button 61 moved in the direction of the arrow 70 to place the elastomer 62 in tension. It will be obvious that many modifications may be made on the compressive and tensile stress measuring schemes illustrated herein to enable one skilled in the art to measure a variety of forms of stress including torsional and shear stress.

The small size, high sensitivity, uncomplicated construction, linearity of response, negligible distortion of pressure distribution, ruggedness, and suitability for internal stress measurements are unique to the stress sensor and stress sensing system of the present invention. Further, theoretical confirmation of stress readings provided by the stress sensor and system of the present invention adds to its desirability; it will therefore be obvious to those skilled in the art that many modifications of the present invention may be made without departing from the spirit and scope thereof.

I claim:
1. A stress sensing system comprising:
 (a) a piezothermal means defining an elastomer deformable under stress;
 (b) a thermistor imbedded in said elastomer;
 (c) a current source;
 (d) means connecting said current source to said thermistor to form a completed electrical circuit;
 (e) detector means for detecting and indicating a change of current flowing in said electrical circuit;
 (f) a rigid shell encasing said elastomer to resist deformation of said elastomer in predetermined directions while permitting deformation in other predetermined directions.
2. A stress sensing system comprising:
 (a) a piezothermal means defining an elastomer deformable under stress;
 (b) a thermistor imbedded in said elastomer;
 (c) a current source;
 (d) means connecting said current source to said thermistor to form a completed electrical circuit;
 (e) detector means for detecting and indicating a change of current flowing in said electrical circuit;
 (f) a rigid cylindrical shell encasing said elastomer to permit deformation of said elastomer in only a selected direction.
3. A stress sensing system comprising:
 (a) a piezothermal means defining an elastomer deformable under stress;
 (b) a thermal-resistance means defining an electronic conductor having a resistivity at room temperature in the range of $10^{-2}$ to $10^9$ ohm-centimeters imbedded in said elastomer;
 (c) a current source;
 (d) means connecting said current source to said thermistor to form a completed electrical circuit;
 (e) detector means for detecting and indicating a change of current flowing in said electrical circuit;
 (f) a rigid shell encasing said elastomer to resist deformation of said elastomer in predetermined directions while permitting deformation in other predetermined directions.
4. A stress sensing system comprising:
 (a) a piezothermal means defining an elastomer deformable under stress;
 (b) a thermal-resistance means defining an electronic conductor having a resistivity at room temperature in the range of $10^{-2}$ to $10^9$ ohm-centimeters imbedded in said elastomer;
 (c) a current source;
 (d) means connecting said current source to said thermistor to form a completed electrical circuit;
 (e) detector means for detecting and indicating a change of current flowing in said electrical circuit;
 (f) a rigid cylindrical shell encasing said elastomer to permit deformation of said elastomer in only a selected direction.
5. A stress sensor comprising a piezothermal means defining elastomer deformable under stress, a thermistor imbedded in said elastomer, and a rigid shell encasing said elastomer to resist deformation of said elastomer in predetermined directions while permitting deformation in other predetermined directions.
6. A stress sensor comprising a piezothermal means defining an elastomer deformable under stress, a thermistor imbedded in said elastomer, a rigid cylindrical shell encasing said elastomer to permit deformation of said elastomer in only a selected direction.

References Cited by the Examiner
UNITED STATES PATENTS

| | | | |
|---|---|---|---|
| 1,680,589 | 8/1928 | Bock | 73—15.6 |
| 1,994,388 | 3/1935 | Erichsen | 73—141 |
| 3,009,056 | 11/1961 | Bone et al. | 73—141 X |
| 3,036,458 | 5/1962 | Vali | 73—141 X |

RICHARD C. QUEISSER, *Primary Examiner.*

C. A. RUEHL, *Assistant Examiner.*